Nov. 17, 1964 C. O. DONLEY ETAL 3,157,066
VARIABLE SPEED ACCESSORY DRIVE
Filed Nov. 10, 1961 4 Sheets-Sheet 1

INVENTORS
Robert E. Morgan,
Carson O. Donley,
Dan B. Kuiper &
Elias W. Scheibe
BY
ATTORNEY Nov. 17, 1964
C. O. DONLEY ETAL
3,157,066
VARIABLE SPEED ACCESSORY DRIVE
Filed Nov. 10, 1961
4 Sheets-Sheet 2
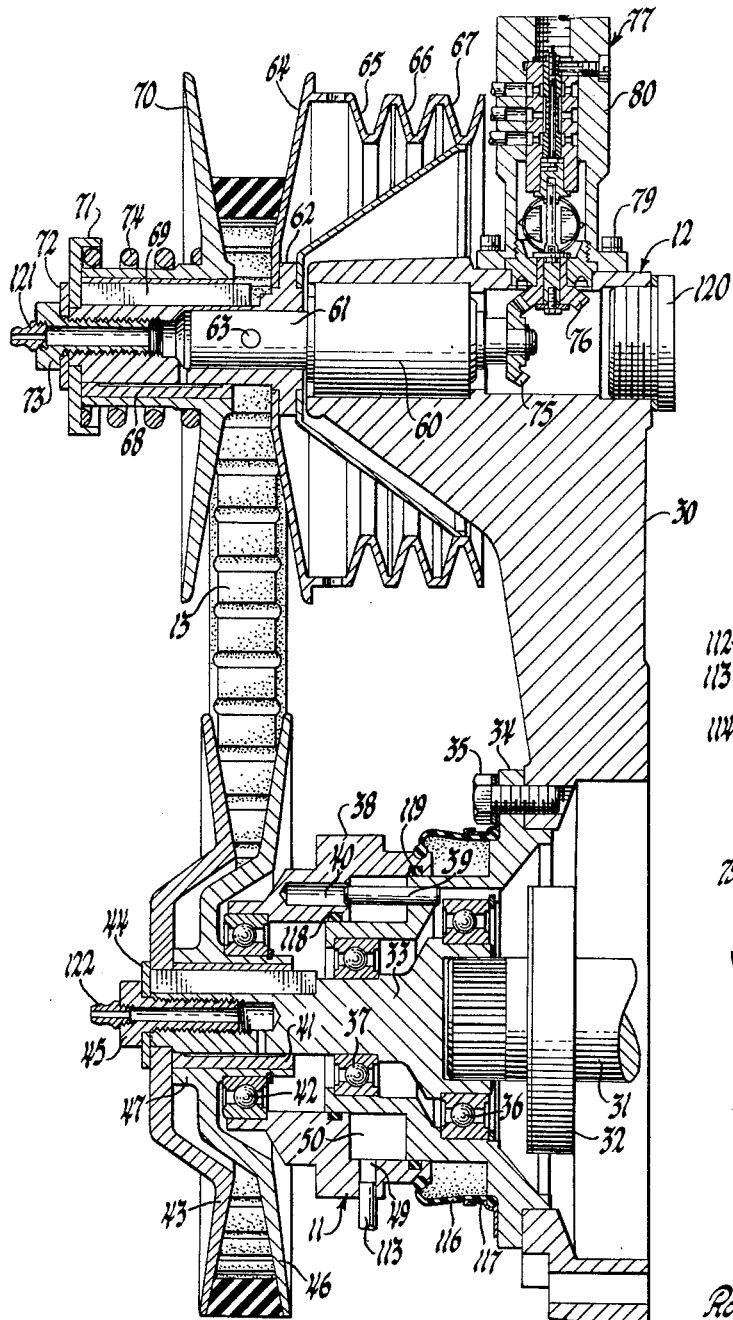
Fig. 3
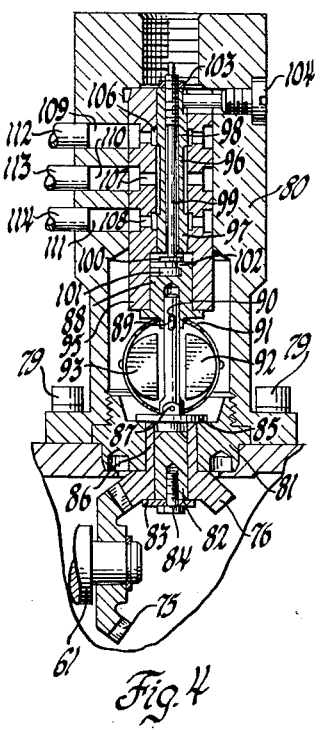
Fig. 4a
Fig. 4
INVENTORS
Robert E. Morgan,
Carson O. Donley,
BY Dan B. Kuiper &
Elias W. Scheibe
ATTORNEY Nov. 17, 1964  C. O. DONLEY ETAL  3,157,066
VARIABLE SPEED ACCESSORY DRIVE
Filed Nov. 10, 1961  4 Sheets-Sheet 3

INVENTORS
Robert E. Morgan,
Carson O. Donley,
Dan B. Kuiper &
Elias N. Scheibe
BY
L. L. Spencer
ATTORNEY

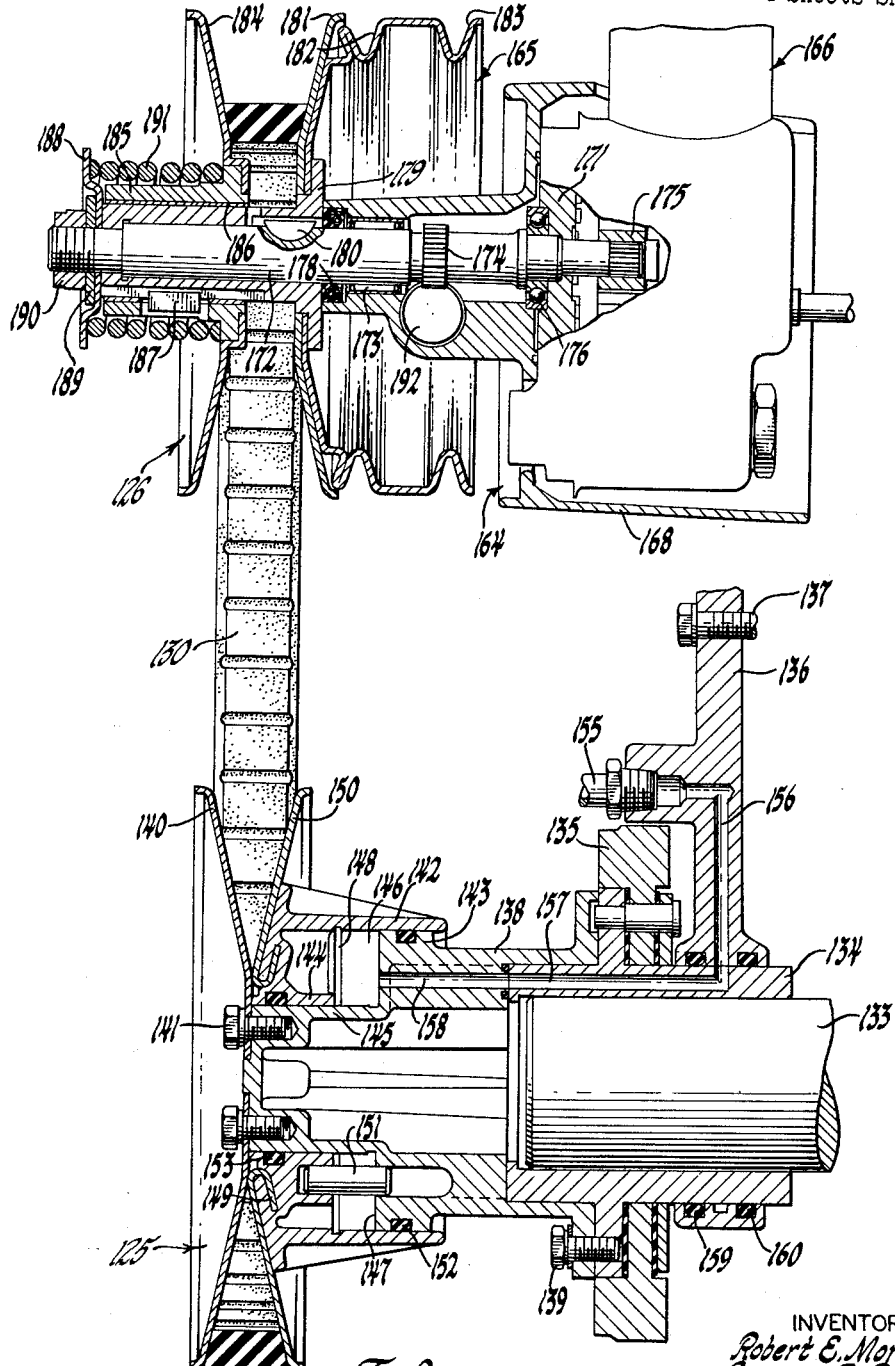

United States Patent Office 3,157,066
Patented Nov. 17, 1964

3,157,066
VARIABLE SPEED ACCESSORY DRIVE
Carson O. Donley, Dan B. Kuiper, Elias W. Scheibe, and Robert E. Morgan, all of Grand Rapids, Mich., assignors to General Motors Corporation, Detroit, Mich., a corporation of Delaware
Filed Nov. 10, 1961, Ser. No. 151,506
6 Claims. (Cl. 74—665)

This invention relates to vehicle engine accessory drives and more particularly to an improved variable ratio accessory drive constructed and arranged to provide controlled speeds for all of the engine driven accessories rather than only part of such accessories. The variable speed drive provides both a speed-up of the drive of the accessories with respect to engine speed in one predetermined speed range of the engine and a slow-down of the accessories with respect to engine speed in a second speed range of the engine. Control of accessory speed is continuously variable as distinguished from step-type or shifting speed changes. Such shifting speed changers are not acceptable for commercial use in automotive vehicles because of noise and power surges encountered in step ratio speed controllers. The continuously variable speed ratio changing device is constructed to provide rapid and precise change of accessory drive ratio. Such performance must be rapid enough to follow vehicle transmission downshifts or sudden engine speed changes in order to minimize the accessory noise. Again, the speed changer is constructed to be highly efficient mechanically in order to reduce power losses which are reflected in poor engine fuel economy.

As will hereafter be more apparent, the accessory drive is controlled to provide a fixed speed ratio of accessory drive, for example 2 to 1 at engine idle speed and speeds up to 750 r.p.m. engine speed; to provide a variable ratio providing constant accessory speed at engine speeds varying from 750 to 2,000 r.p.m.; and to provide a fixed underdrive ratio of .75 to 1 at engine speeds above 2,000 r.p.m.

It will readily be understood that definite improvement in performance of the accessories such as the water pump and fan, air conditioning compressor, electrical generating system capacity will be had at low engine speeds and that noise, wear and fuel consumption of the accessories will be minimized at normal and high engine speeds, thereby contributing to long service-free useful accessory life. In conventional belt drive arrangements wherein the accessories are driven by fixed ratio belt drives and driven from a pulley on the engine crankshafts, the accessories must operate over a 9 to 1 speed range, depending upon engine speed changes. The control and drive arrangement of the present invention permits the accessories to operate over a speed range of 3.37 to 1 rather than the 9 to 1 speed range found in conventional engine driven accessory drive arrangements.

Various embodiments and features of the invention are shown in FIGURES 1 through 9 in which:

FIGURE 3 is a sectional view through one embodiment of an accessory drive illustrating details of structure of an actuator unit and a drive ratio control unit.

FIGURE 4 is an enlarged sectional view of the governor unit shown in FIGURE 3 illustrating the details of the governor.

FIGURE 4a is an enlarged sectional view of a modified stem arrangement to that of FIGURE 4, constructed and arranged to provide rotation of the governor valve in response to rotation of the governor weights.

FIGURE 9 is a sectional view through a simplified actuator unit and control unit assembly.

Figure 1:
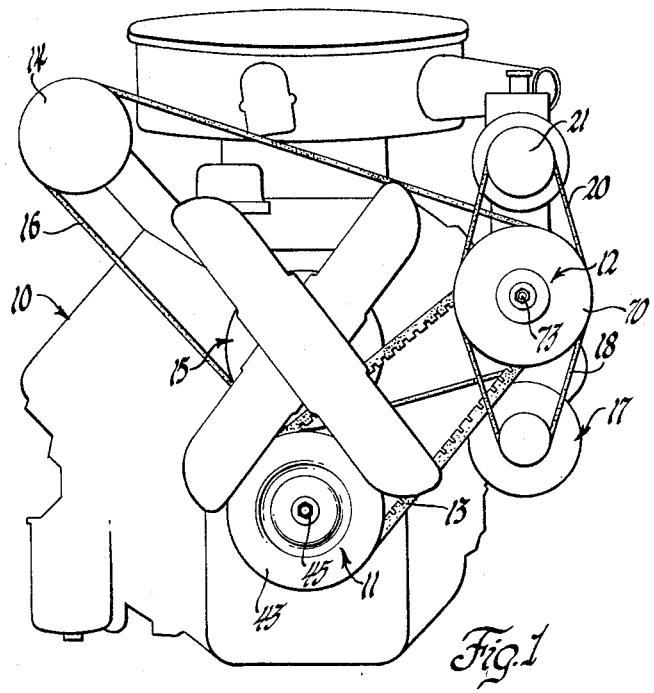
FIGURE 1 is an end view of an engine embodying an accessory drive ratio control assembly constructed in accordance with the principles of this invention.

Referring to FIGURE 1 there is shown an engine 10 having a variable speed drive arrangement constructed according to the principles of this invention and including an actuator assembly indicated generally at 11 and a control assembly indicated generally at 12. Actuator assembly 11 driven by the engine crankshaft drives control assembly 12 by means of a heavy duty belt 13. A power steering pump 21 is driven by a belt 20. An air conditioning compressor 14 and a combined fan and water pump unit 15 are driven from control assembly 12 by means of a belt 16. A generator 17 is driven from unit 12 by means of a belt 18.

Figure 2:
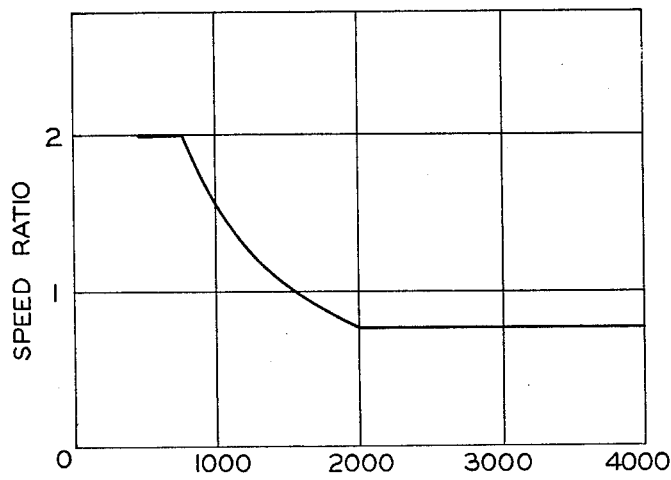
FIGURE 2 is a curve illustrating the speed ratio of the accessory drive assembly related to engine speed.

FIGURE 2 is a curve showing the accessory speed ratio curve related to engine speed of the drive arrangement hereafter more fully described. As shown, in a first engine speed range from engine idle up to 750 r.p.m. the accessory drive ratio is 2 to 1. In an engine speed range between 750 r.p.m. and 2,000 r.p.m. the accessory drive ratio decreases, and at engine speeds above 2,000 r.p.m. the accessory drive ratio remains constant at .75 times engine speed. As is clear from the curve, the accessory drive ratio drops rapidly from 2 to 1 to 1 to 1 at engine speeds from 750 to 1,500 r.p.m. with underdrive of the accessories being provided at engine speeds above 1,500 r.p.m. The rapid drop of drive ratio which occurs when accelerating the engine from idle speed in the initial stages of engine acceleration is an important feature in that such rapid decrease of drive ratio prevents undesirable over-speeding of the accessories during engine acceleration. An additional important feature is the provision of a "fail safe" design whereby the accessories will automatically be driven in underdrive, or slower than engine speed, in the event of loss of hydraulic control fluid. Hydraulic fluid at a relatively high pressure of the order of 120 pounds per square inch is required to operate a hydraulic cylinder that shifts the belt ratios. The design is such that hydraulic pressure is required to place the drive in its high ratio or 2 to 1 step-up condition of operation. As the engine speed is increased, pressure to the hydraulic cylinder is decreased by a centrifugal control and at engine speeds of 2,000 r.p.m. and above no hydraulic pressure is delivered to the control cylinder. This feature makes the design "fail safe" in that overspeed of the accessories is prevented, since a loss of hydraulic pressure for any reason merely shifts the drive to underdrive ratio and the drive continues to operate.

An additional feature is the arrangement wherein the entire assembly including the actuator assembly 11 and the control assembly 12 are joined together on a common support housing adapted to be fitted upon an engine as a single unit. The unitized accessory drive wherein the entire mechanism is incorporated in one assembly is of distinct advantage in production assembly.

Referring to FIGURE 3 there is shown one embodiment of the actuator and control unit assembly. In this arrangement both the actuator unit 11 and accessory drive control unit 12 are mounted upon a common housing 30 to form an integral structure adapted to be mounted as a unit on the front of the engine 10 of FIGURE 1. The provision of the common housing 30 with the actuator unit 11 and control unit mounted thereon greatly facilitates and simplifies the assembly of the variable speed drive arrangement to the engine thereby reducing costs of final assembly on the factory assembly line.

In FIGURE 3 an extension of an engine crankshaft 31 carries crankshaft vibration dampener of conventional construction 32 and is splined to receive one end of an actuator power input shaft 33 such that shafts 31 and 33 rotate as a unit. An actuator body 34 is bolted to housing 30 by a series of bolts, one of which is shown at 35. Shaft 33 is of stepped diameter and is rotatably supported in body 34 by means of ball bearings 36 and 37 disposed between internal cylindrical surfaces of body 34 and external surfaces of shaft 33. An actuator sleeve 38 is carried on the external portion of body 34 for axial motion with respect to body 34. An actuator sleeve guide pin 39 fixed to body 34 extends into an opening 40 in sleeve 38 to prevent rotation of sleeve 38 and for permitting axial motion of the sleeve with respect to body 34. An axially movable actuator pulley control sheave 46 has its hub 47 supported upon a bushing 41 carried by shaft 33 and axially movable with respect to shaft 33. Pulley control sheave 46 is additionally supported upon sleeve 38 by means of a ball bearing 42 disposed between the external surfaces of hub 47 and sleeve 38. A second pulley sheave 43 is fixed to the end of shaft 33 by means of a washer 44 and a bolt 45. Pulley sheave 43 cooperates with one end of hub 47 to limit the permissible range of motion of pulley sheave 46 to the left as viewed in FIGURE 3, and therefore may be termed an actuator limiting sheave. Sleeve 38 and housing 34 are of stepped configuration in order to form a cylindrical chamber 50 therebetween adapted to receive fluid under pressure through a suitable passage 49 in sleeve 38 from a governor device hereafter more fully described.

As heretofore stated the accessory speed ratio control unit 12 is mounted upon housing 30, as is power input unit 11. A bearing 60 is press-fitted into housing 30 in order to support a shaft 61 for rotation in the housing. A hub 62 supported upon shaft 61 and pinned to shaft 61 by means of a pin 63 carries a drive limiting sheave 64 and three accessory belt pulleys 65, 66 and 67. Hub 62 extends axially beyond the end of shaft 61 and supports a bushing 68, the bushing being keyed to hub 62 by means of a key 69. Bushing 68 supports an axially movable drive control sheave 70 on its external cylindrical surface. A spring seat 71 carried by the end of the extension of hub 62 is retained thereon by means of a washer 72 and a bolt 73. A spring 74 seated upon seat 71 and pulley sheave 70 biases pulley 70 against belt 13 and permits axial motion of pulley 70 to the left as viewed in FIGURE 3. As further shown in FIGURE 3, shaft 61 extends beyond bearing 60 to drive a gear 75 mating with a governor drive gear 76 in order to drive a governor generally indicated at 77. A governor body 80 is secured to housing 30 by means of bolts 79.

Details of the governor assembly are best shown in FIGURE 4 wherein governor body 80 has a cap 81 screw threaded into one end thereof for rotatably supporting gear 76. A governor shaft 82 is fixed to gear 76 by means of a washer 83 and a bolt 84. An upstanding flange 85 on shaft 82 provides an abutment for a sleeve 86 integral with gear 76 so that the bolt 84 may be tightened without binding gear 76 on housing 80. A circular spring 91 is fixed to shaft 82 by means of a pin 87 carried by shaft 82 and positioned on the shaft to retain spring 91 between the pin and flange 85. Spring 91 will rotate with shaft 82 and has one side thereof fixed against axial motion by pin 87. Shaft 82 has its inner end supported in a bushing 88 carried by a valve guide 95 and axially movable with respect to guide 95. The opposite side of spring 91 is fixed to bushing 88 by means of a pin 89 carried by the bushing 88 and extending through a slot 90 in shaft 82. A pair of flyweights 92 and 93 are carried by spring 91. A governor valve 96 axially movable in valve guide 95 has spaced lands 97 and 98 and is drilled axially to receive a governor valve adjusting rod 99. One end of rod 99 has two spaced upstanding flanges 100 and 101 thereon for receiving a hook 102 formed on bushing 88. The opposite end of rod 99 is threaded for a considerable distance to receive a valve adjusting nut 103. A valve guide screw 104 threaded into housing 80 retains the valve guide 95 in a fixed position in housing 80. Valve guide 95 is provided with fluid ports 106, 107 and 108 adapted to be controlled by spaced lands 97 and 98 of valve 96.

In operation, weights 92 and 93 driven by gear 76 and shaft 82 through circular spring 91 will fly outwardly due to centrifugal force as the speed of rotation of spring 91 increases, thereby causing the spring 91 to assume an elliptical rather than a circular or cylindrical shape. Since pin 87 holds one side of the spring against axial motion, pin 89 will be pulled axially toward pin 87, pulling bushing 88, rod 99 and governor valve 96 axially to control fluid flow through ports 106, 107 and 108. Nut 103 permits initial adjustment of governor valve 96 on rod 99 to position the valve on the rod 99 in such a position that at low engine speeds, or engine idle, spring 91 will position the land 98 to permit fluid flow from port 106 to port 107 and to position land 97 to block off port 108. Port 106 is a pressure supply port adapted to receive fluid under pressure from a power steering pump through a passage 109 in housing 80 and a pipe 112. Port 107 communicates with a pressure delivery passage 110 which is connected to servo actuator chamber 50 of FIGURE 3 through a passage 49 in sleeve 38 of FIGURE 3 by means of a pipe 113. Port 108 communicates with a passage 111 in housing 80 connected to a pipe 114 which returns oil to a power steering pump sump. As stated, at engine idle, pressure from the power steering pump will be supplied to servo chamber 50 of FIGURE 3 to force sleeve 38 to its extreme left-hand or high speed position shown in FIGURE 3. Pulley sheave 46 will move axially with sleeve 38 to force belt 13 to the outer periphery of the drive pulley. Belt 13 will move inwardly in the driven pulley, forcing sheave 70 to compress spring 74. This is the maximum or 2 to 1 drive ratio. As the engine speeds up, weights 92 and 93 cause spring 91 to become elliptical in shape, moving valve 96 down as viewed in FIGURE 4 to cause land 98 to increasingly block off port 106 and to connect port 107 to port 108. This action reduces the pressure delivered to servo chamber 50 through port 107 until at an engine speed of 2,000 r.p.m. no fluid is directed to servo chamber 50 and the chamber is connected to exhaust by way of passages 113, ports 107, 108 and passage 114. Spring 74 of FIGURE 3 will force sheave 70 toward sheave 64, forcing belt 13 to its outermost position in the driven pulley and into its innermost position on the drive pulley. This reduces the drive ratio of the accessories to maximum underdrive or a drive ratio of .75 to 1.

In FIGURE 3 there is shown one of a series of ears 115 on housing 30 whereby the housing may be bolted to the front end of a vehicle engine. Also shown is a protective boot 116 having one end secured to axially movable sleeve 38 and the other end fixed to housing 34 by a retainer 117. Also shown are a pair of O-ring oil seals 118 and 119 for preventing escape of fluid from chamber 50. Boot 116 prevents dirt from accumulating on housing 34 adjacent the end of sleeve 38. Such dirt, ice or other accumulation might otherwise render the device inoperative. Also shown in FIGURE 3 is a plug 120 provided for assembly and servicing of gears 75 and 76, and for supplying lubrication; and grease fittings 121 and 122.

Figure 5:
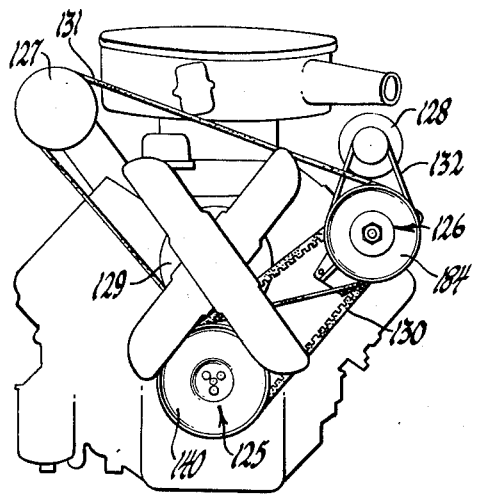
FIGURE 5 is an end view of an engine incoporating an alternate design of accessory drive wherein the vehicle power steering pump and accessory drive ratio control unit are combined in a single unitary assembly.

Referring to FIGURE 5, there is shown a modified drive arrangement including an actuator unit 125, a combined accessory drive control and power steering pump unit 126, a compressor 127, generator 128 and combined water pump and fan drive unit 129. In this arrangement the accessory drive control unit and power steering pump are driven from actuator unit 125 by means of a heavy belt 130; compressor 127 and the water pump and fan unit are driven from the control unit 126 by a belt 131; and the generator is driven from control unit 126 by a belt 132.

In this arrangement both the actuator unit and drive ratio control unit are modified to simplify the design and reduce costs. As shown in FIGURE 9 an extension of an engine crankshaft 133 drives a hub 134 on which is supported a crankshaft balancer 135. A housing 136 is adapted to be bolted to the vehicle engine by means of suitable bolts, one of which is shown at 137. Balancer hub 135 driven by crankshaft 133 is supported for rotation on hub 134, the hub 134 being press fitted on shaft 133. An actuator housing 138 is bolted to crankshaft balancer hub 134 by means of a series of bolts, one of which is shown at 139. A pulley sheave 140 is bolted to the end of housing 138 by means of bolts 141. An axially movable sleeve 142 is supported for axial motion with respect to housing 138 on a boss 143 on housing 138 and includes a foot 144 axially movable on a cylindrical portion 145 of housing 138. A chamber 146 adatped to receive fluid under pressure is formed between the large diameter portion of sleeve 142, the smaller diameter portion 145 of housing 138, wall 147 of housing 138 and an annular piston 148 carried by the large diameter portion of sleeve 142 and abutting the end of foot 144. A pulley sheave 150 is secured to sleeve 142 for rotation and axial motion with sleeve 142, by means of a bent-up flange 149. A pin 151 carried by sleeve 142 pins the sleeve 142 to housing 138 and permits axial motion of sleeve 142 with respect to housing 138. O-ring oil seals 152 and 153 prevent leakage of oil from chamber 146 and through the outer end of the assembly. On O ring seal 154 is disposed between the end of hub 134 and portion 145 of housing 138.

Fluid under pressure may be admitted to chamber 146 to control the drive ratio by means of a pipe 155, a passage 156 in housing 136, passage 157 in balancer hub 134 and a passage 158 in housing 138. O ring oil seals 159 and 160 prevent oil leakage at the rotating connection of passage 157 with passage 156.

Figure 6:
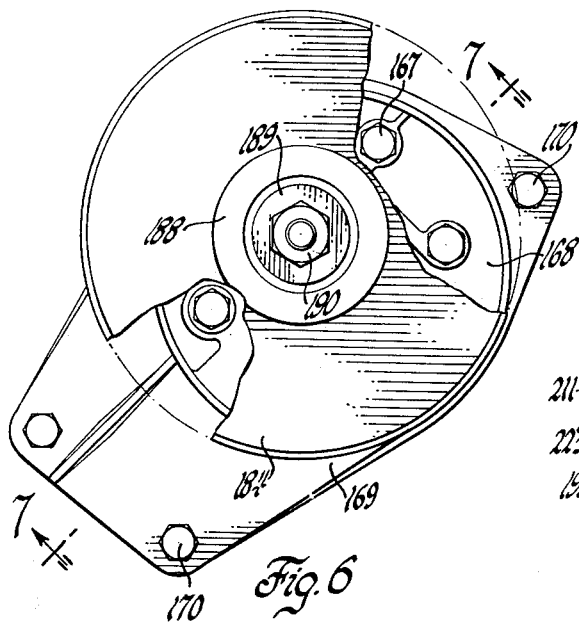
FIGURE 6 is an end view of the combined drive ratio control unit and power steering pump with parts broken away to illustrate mounting bolts whereby the drive ratio control unit is mounted upon the power steering pump unit.

As further shown in FIGURE 9, an accessory drive control unit 165 and a power steering pump 166 are joined together to constitute the combined unit indicated generally at 164. Accessory drive control unit 165 is assembled to power steering pump unit 166 by means of a series of bolts 167 best shown in FIGURE 6. A power steering pump support housing 168 includes a plate 169 having bolts 170 extending therethrough whereby the entire assembly including the drive ratio control unit 165 and power steering pump 166 may be mounted upon housing 136 of FIGURE 9. This arrangement provides a complete subassembly adapted to readily be mounted on the engine by bolts 137 of FIGURE 9.

Details of the combined accessory drive ratio control unit and power steering pump unit are shown in FIGURE 9. As shown, power steering pump support housing 168 supports a shaft 172 for rotation therein by means of a needle bearing 173. Shaft 172 drives a gear 174 and a power steering pump impeller 175 which is of conventional construction, the shaft 172 being supported in pump housing 171 by means of a bearing 176. An oil seal 178 is positioned between shaft 172 and support housing 168 adjacent needle bearing 173. A pulley hub 179 keyed to shaft 172 by a key 180 carries a sheave 181 and a pair of pulleys 182 and 183. A second pulley sheave 184 fixed to a hub 185 is supported upon a bushing 186 on an extension of pulley hub 179. A key 187 pins pulley hub 185 to hub 179 but permits axial motion of sheave 184 with respect to hub 179. A spring seat 188 is supported upon shaft 172 by means of a washer 189 and a nut 190. A spring 191 seated upon seat 188 yieldably biases hub 185 and sheave 184 toward the pulley sheave 181. Gear 174 drives a governor drive gear 192.

Figure 7:
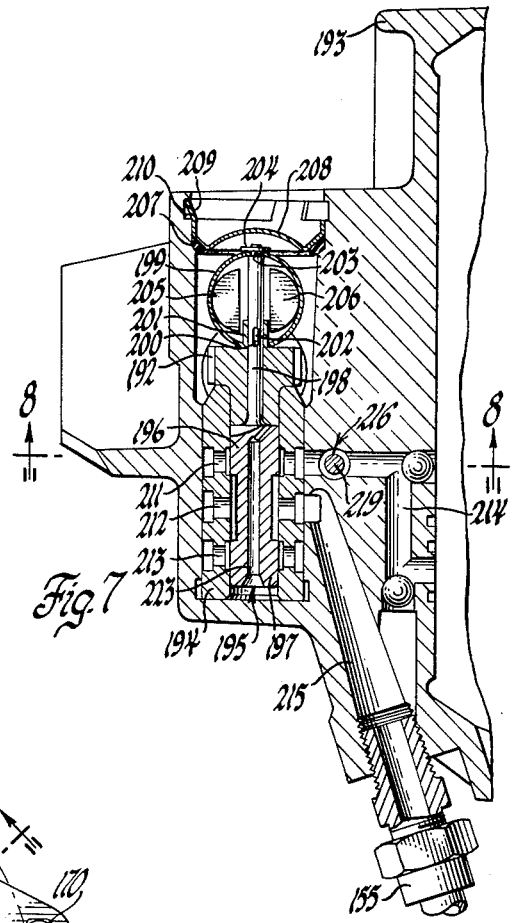
FIGURE 7 is a sectional view taken along the line 7—7 of FIGURE 6.
Figure 8:
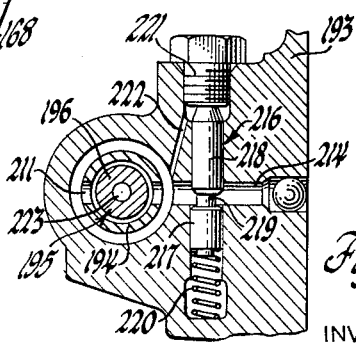
FIGURE 8 is a sectional view taken along the line 8—8 of FIGURE 7.

Details of the governor arrangement are best shown in FIGURES 7 and 8. A governor housing 193 which may be bolted to support housing 168 of FIGURE 9 by means of suitable bolts, not shown, and a valve guide 194 press-fitted into housing 193 support gear 192 for rotation therein. A governor spool valve 195 is provided with spaced lands 196 and 197 and a stem 198 which extends through gear 192. A circular spring 199 has one side thereof fixed to gear 192 by means of a pin 200, the pin extending through an axially extending boss 201 on gear 192 to pin the spring to the gear and also extending through a slot 202 formed in stem 198. The opposite side of spring 199 is fixed to stem 198 by means of pins 203 and 204. Spring 199 carries weights 205 and 206. An oil seal 207 is disposed between housing 193 and an end cap 208 to prevent oil leakage through the cap. Cap 208 is formed of stamped sheet metal and has fingers 209 adapted to be fitted into recesses 210 of housing 193 in order to retain the cap on the housing. Cap 208 permits the housing to be filled with oil. Valve guide 194 has formed therein a series of ports 211, 212, 213. Pressure from power steering pump 166 is supplied to port 211 through a passage 214. Port 212 communicates with a fluid delivery passage 215 adapted to be connected to servo chamber 146 of FIGURE 6 by pipe 155. Port 213 is an oil return port for returning oil to the power steering pump.

As shown in FIGURE 8, pressure supply passage 214 is provided with a pressure regulator valve indicated generally at 216, in order to regulate pressure supplied to governor valve 195. Valve 216 is provided with two spaced lands 217 and 218 joined by a reduced stem section 219. A spring 220 normally biases valve 216 against an end cap 221 in housing 193 to permit oil flow through passage 214. It will be noted that with the valve in its extreme raised position shown, land 218 partially restricts fluid flow through passage 214. This partial restriction prevents pressure surges to governor valve 197 as might otherwise occur due to varying demand for pressure on the part of the power steering unit. A passage 222 admits pressure from the downstream side of pressure regulator valve 216 to the end of land 218 adjacent end cap 221. An oil return port (not shown) is controlled by land 217 such that fluid may be returned to the power steering pump when valve 216 moves downwardly against spring 220. Spool valve 195 has a passage 223 drilled therethrough to prevent any possible oil block at either end thereof as might otherwise render the valve inoperative.

In operation, at low speeds of rotation, land 197 will block off oil return port 213 and land 196 will permit oil flow from passage 214 to passage 215 by way of ports 211 and 212. At low speeds this pressure will be maximum. As the speed of rotation of gear 192 increases, weights 205, 206 will move outwardly, causing spring 199 to assume an elliptical rather than a circular shape. Stem 198 and valve 195 will move to block off port 211 and connect port 212 to exhaust port 213. When this is accomplished, passage 215 and servo chamber 146 of FIGURE 6 will be connected to exhaust. In between these two conditions of operation the pressure supplied to the actuator unit will decrease with increase in speed of rotation of the drive ratio control unit governor. At low speeds, pressure in chamber 146 of FIGURE 9 will shift the belt 130 for 2 to 1 drive ratio of the accessories. At high speeds, above 2,000 r.p.m., pressure in chamber 146 will be zero and the belts will provide underdrive of the accessories in the ratio of .75 to 1.

In both embodiments of the invention there is provided a variable diameter engine driven pulley and a variable diameter pulley for driving the accessories and driven by means of a belt connecting the pulleys. In both embodiments a servo chamber is adapted to receive hydraulic pressure and the engine driven pulley includes an axially movable sheave movable in response to changes in pressure in the servo chamber. In both embodiments a spring yieldably biases the driven pulley to its maximum diameter position and a rise in pressure in the servo chamber biases the engine driven pulley toward its maximum diameter position. As the pressure in the servo chamber decreases, the spring associated with the accessory drive pulley biases the pulley toward its maximum diameter position and the engine driven pulley moves towards its minimum diameter position. In both embodiments, a governor driven proportional to the speed of rotation of the accessory drive pulley delivers maximum pressure to the servo chamber at low governor speeds of rotation and decreases the pressure in the chamber with rise of governor speed. The governor provides for rapid decrease of pressure in the chamber as the governor speed initially increases to prevent overspeed of the accessories during periods of rapid engine acceleration. The drive ratio varies from 2 to 1 when full pressure is delivered to the servo chamber to .75 to 1 when the servo chamber is connected to exhaust.

Referring again to FIGURE 4, it has been found that in the operation of the governor that axial motion of the governor valve 96, is not always consistent with changes in the position of flyweights 92 and 93. While the embodiment in FIGURE 4 is satisfactory as a practical matter, it has been found that the somewhat erratic performance arises due to stickiness of the oil between the lands and valve guide 95. It will be noted that in the FIGURE 4 embodiment, valve 96 is not rotated, since hook 102 of bushing 88 merely rotates in the space between flanges 100 and 101.

It has been found that improved performance can be obtained by either positively rotating the spool valve by a direct drive or by non-positively rotating the spool valve by a spring. In the FIGURE 7 arrangement the spool valve 195 is positively rotated by pin 260.

In FIGURE 4a, a bushing 225 corresponding to bushing 88 of FIGURE 4 and driven by the gear 76 of FIGURE 4 may receive a head 228 of a governor valve 230 in a groove 229 formed by lands 226 and 227 on bushing 225. A spring 231 positioned between land 226 and head 228 biases the head into friction engagement with land 227 to cause rotation of governor valve 230 in response to rotation of bushing 225. It will readily be understood that bushing 225 will be rotated in the same manner as bushing 88 of FIGURE 4.

In both the FIGURE 4a and FIGURE 7 embodiments reliability of operation and overall performance is improved due to rotation of the spool governor valve which reduces hydraulic sticking forces. Continual rotation of the spool valve with respect to the porting cylinder or valve guide prevents the hydraulic fluid from locking the spool axially and creates continuous shearing of the oil film between the valve and valve guide. In the absence of rotation, additional axial force is required to initially shear the oil film, thereby requiring a governor capable of exerting a larger force. Capability for "digesting" dirt particles also is improved since the rotating motion can crush or shear particles which might otherwise wedge between the spool valve and valve guide.

Non-positive rotation of the spool valve because of the wedging action of spring 231 of FIGURE 4a is advantageous because the spring will automatically eliminate clearance resulting from tolerance stack up in manufacture and will assure immediate axial motion of the valve in response to movement of the governor weights. In addition, more accurate initial valve adjustment with respect to the ports can be obtained since tolerance stack up of the ports is eliminated.

What is claimed is:

1. A variable speed drive assembly for driving the accessories of an engine including a first variable diameter pulley driven by said engine, a second variable diameter pulley connected to drive said accessories, a belt connecting said variable diameter pulleys, a servo chamber associated with said first pulley adapted to receive fluid under pressure, spring means for urging said second variable diameter pulley to maximum diameter, means responsive to fluid pressure in said chamber for urging said first pulley to its maximum diameter, and governor means including a rotatable member rotated at a speed proportional to accessory speed and a valve operatively connected to said rotatable member for controlling the pressure in said servo chamber, said governor means being effective throughout a first speed range of rotation thereof to maintain a constant maximum pressure in said servo chamber irrespective of the speed of rotation of said governor in said speed range, said governor being effective in a second speed range of rotation thereof to progressively reduce the pressure in said servo chamber in response to increase in speed of rotation of said governor throughout said second speed range, said governor being effective in a third speed range of rotation thereof to connect said servo chamber to exhaust irrespective of changes in speed of rotation of said governor within said third speed range.

2. A variable speed drive assembly for driving the accessories of an engine including a first variable diameter pulley driven by said engine, a second variable diameter pulley connected to drive said accessories, a belt connecting said pulleys whereby said second pulley is driven by said first pulley, a servo chamber operatively associated with said first pulley adapted to receive fluid under pressure, spring means for urging said second pulley to its maximum diameter, said first pulley being movable in response to rise in pressure in said chamber to increase the diameter of said first pulley, a governor including a rotatable member driven at a speed proportional to the speed of rotation of said second pulley and a valve controlled by said rotatable member for controlling the pressure in said servo chamber, said governor being effective throughout a first relatively slow speed range of rotation to deliver maximum pressure to said servo chamber, said governor being effective in a second intermediate speed range of rotation thereof to decrease the pressure in said chamber with increase of rotation of said governor and to increase the pressure in said servo chamber upon decrease in speed of rotation of said governor, said governor being effective in a third relatively high speed range of rotation thereof to connect said servo chamber to exhaust.

3. A variable speed drive assembly for driving the accessories of an engine including an actuator unit and a drive ratio control unit, means connecting said accessories to said drive ratio control unit for rotation at a speed proportional to the speed of rotation of said drive ratio control unit, said actuator unit including a variable ratio pulley driven by said engine and a servo chamber adapted to receive fluid under pressure, said drive ratio control unit including a variable diameter pulley, a belt connecting said pulleys whereby said drive ratio control unit is driven by said actuator unit, spring means for positioning said variable ratio pulley of said drive ratio control unit to establish maximum diameter of said pulley whereby said accessories are driven at minimum drive ratio when said servo chamber is connected to exhaust, a hydraulic governor including a rotatable member driven at a speed proportional to the speed of rotation of said accessories and a valve connected to and movable by said rotatable member for controlling the pressure supplied to said servo chamber, said governor being constructed and arranged to deliver a fixed maximum line pressure to said servo chamber in a first relatively slow speed range of rotation of said governor to establish overdrive of said accessories irrespective of the speed of rotation of said governor in said first speed range, said governor being effective in a second relatively higher speed range of rotation thereof to progressively reduce the pressure in said servo chamber in response to increase of speed of rotation of said governor within said second speed range to progressively reduce the speed of rotation of said accessories to underdrive, said governor being effective throughout a third relatively higher speed range of rotation to connect said servo chamber to exhaust to establish a fixed underdrive drive ratio for driving said accessories irrespective of the speed of rotation of said governor in said third speed range.

4. A variable speed drive assembly for driving the accessories of an engine including an actuator unit and a drive ratio control unit, means connecting said accessories to said drive ratio control unit for rotation at a speed proportional to the speed of rotation of said drive ratio control unit, said actuator unit including a variable ratio pulley driven by said engine and a servo chamber adapted to receive fluid under pressure, said drive ratio control unit including a variable diameter pulley, a belt connecting said actuator unit pulley to said drive ratio control unit pulley for driving the same, a spring for positioning the variable ratio pulley of said drive ratio control unit to establish minimum speed of rotation of said accessories with respect to the speed of rotation of said actuator unit pulley when said servo chamber is connected to exhaust, a hydraulic governor including a rotatable member driven at a speed proportional to the speed of rotation of said accessories and a valve controlled by said rotatable member and connected to deliver variable fluid pressure to said servo chamber, said governor being constructed and arranged to deliver maximum pressure to said servo chamber throughout a first relatively low speed range of said accessories to establish a fixed overdrive drive ratio of said accessories irrespective of the speed of rotation of said governor within said first relatively low speed range, said governor being constructed and arranged to progressively reduce the pressure in said servo chamber in response to increase in speed of rotation of said governor throughout a second higher speed range of rotation of said governor to progressively reduce the drive ratio from said fixed overdrive drive ratio to a fixed underdrive drive ratio as the speed of rotation of said governor increases from one limit of said second speed range to a second limit of said second speed range, said governor being constructed and arranged in a third higher speed range of rotation thereof to connect said servo chamber to exhaust to maintain said fixed underdrive drive ratio irrespective of the speed of rotation of said governor in said third speed range.

5. A variable speed drive assembly for driving the accessories of an engine including a first variable diameter pulley driven by said engine, a second variable diameter pulley connected to drive said accessories, said accessories including a pump driven by said second pulley, a common housing for supporting both of said pulleys as a subassembly readily adapted to be assembled to said engine, a servo chamber associated with said first pulley and adapted to receive fluid under pressure, a belt connecting said pulleys whereby said second pulley is driven by said first pulley, spring means for urging said second variable diameter pulley to its maximum diameter the pressure in said servo chamber being effective to urge said first pulley to its maximum diameter upon rise of pressure in said chamber, a hydraulic governor including a rotatable member driven at a speed of rotation proportional to the speed of rotation of said second pulley and a valve controlled by said rotatable member supplied with fluid from said pump and effective to deliver variable pressure to said servo chamber, the pressure delivered to said servo chamber by said governor being a fixed maximum pressure throughout a first low speed range of rotation of said governor, the pressure delivered by said governor in a second speed range of rotation of said governor being progressively decreased in response to increase in speed of rotation of said governor throughout said second speed range, said governor being effective in a third speed and higher speed range of rotation thereof to connect said chamber to exhaust irrespective of the speed of rotation of said governor in said third speed range.

6. A variable drive assembly for driving the accessories of an engine including a first variable diameter pulley driven by said engine at a speed proportional to engine speed, a second variable diameter pulley connected to drive said accessories, a belt connecting said first and second variable diameter pulleys to each other for drive of said second variable diameter pulley by said first variable diameter pulley, a servo chamber associated with said first variable diameter pulley adapted to receive fluid under pressure, spring means for urging said second variable diameter pulley to its maximum diameter, means responsive to pressure in said servo chamber for urging said first variable diameter pulley to its maximum diameter in response to rise in pressure in said servo chamber, an axially movable valve controlling the pressure in said servo chamber, a governor including a weight driven at a speed of rotation proportional to the speed of rotation of said second variable diameter pulley, and means including a spring interposed between said weight and said valve operatively connecting said valve to said weight for both axial and rotary motion of said valve upon rotation of said weight, said governor being effective throughout a first relatively slow predetermined range of rotation thereof to deliver a fixed maximum pressure to said servo chamber to establish a fixed overdrive speed ratio of said second pulley irrespective of the speed of rotation of said governor within said speed range, said governor being effective in a second intermediate speed range of rotation to progressively decrease the pressure in said servo chamber to reduce the speed of rotation of said second pulley from said fixed overdrive to a fixed underdrive speed ratio upon increase in speed of rotation of said governor to the high speed limit of said second speed range, said governor being effective in a third highest speed range of rotation to connect said servo chamber to exhaust to maintain said fixed underdrive ratio irrespective of the speed of rotation of said governor within said third speed range of rotation.

References Cited in the file of this patent
UNITED STATES PATENTS

| | | |
|---|---|---|
| 2,321,455 | Byrne | June 8, 1943 |
| 2,852,950 | Uher | Sept. 23, 1958 |
| 2,891,213 | Kern | June 16, 1959 |
| 2,917,937 | Dodge | Dec. 22, 1959 |
| 3,064,669 | Sheppard | Nov. 20, 1962 |